US011153793B2

(12) United States Patent
Liu et al.

(10) Patent No.: US 11,153,793 B2
(45) Date of Patent: Oct. 19, 2021

(54) REDUCING DATA LATENCY WHEN CELLULAR ACCESS IS BARRED

(71) Applicant: QUALCOMM Incorporated, San Diego, CA (US)

(72) Inventors: Feilu Liu, San Diego, CA (US); Suli Zhao, San Diego, CA (US); Can Zhao, San Diego, CA (US); Mona Agrawal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/387,275

(22) Filed: Apr. 17, 2019

(65) Prior Publication Data
US 2020/0336953 A1    Oct. 22, 2020

(51) Int. Cl.
*H04W 36/00*    (2009.01)
*H04W 36/14*    (2009.01)
*H04W 36/30*    (2009.01)

(52) U.S. Cl.
CPC ....... *H04W 36/0055* (2013.01); *H04W 36/14* (2013.01); *H04W 36/30* (2013.01)

(58) Field of Classification Search
CPC ..... H04W 48/06; H04W 76/18; H04W 48/02; H04W 88/06; H04W 36/0055;
(Continued)

(56) References Cited

U.S. PATENT DOCUMENTS

2009/0088154 A1*  4/2009  Umatt ................... H04W 48/16
                                                                      455/434
2014/0148169 A1*  5/2014  Li ...................... H04W 36/0061
                                                                      455/437
(Continued)

FOREIGN PATENT DOCUMENTS

CN         109104773 A     12/2018
EP            3621352 A1     3/2020
WO     WO-2016018012 A1     2/2016

OTHER PUBLICATIONS

3rd Generation Partnership Project, Technical Specification Group Radio Access Network; NR; Radio Resource Control (RRC) Protocol Specification, 38.331 V15.5.1, Apr. 2019, 491 pages.
(Continued)

*Primary Examiner* — Ricardo H Castaneyra
(74) *Attorney, Agent, or Firm* — Norton Rose Fulbright US LLP

(57) ABSTRACT

Wireless communication methods, devices, and systems to reduce latency when network access (e.g., cellular network access) is barred are described. A method includes receiving, by a user equipment (UE) from an application, a request for at least one of establishment of a packet data unit (PDU) session or uplink (UL) data transfer via a previously established PDU session. The method additionally includes evaluating that access to a first network (e.g., a 3rd Generation Partnership Project (3GPP) network) is barred. The method also includes determining that the access barring time exceeds a threshold, and checking, in response to the determining, that configured policies permit the PDU session to be on a second network (e.g., a non-3GPP network). The method further includes transferring data of the PDU session in accordance with the configured policies. Other aspects and features are also claimed and described.

24 Claims, 10 Drawing Sheets

(58) Field of Classification Search
CPC . H04W 36/14; H04W 36/30; H04W 36/0022; H04W 48/18
See application file for complete search history.

(56) References Cited

U.S. PATENT DOCUMENTS

2015/0173119 A1\* 6/2015 Wirtanen ................. H04J 11/00
 455/452.1
2016/0081027 A1 3/2016 Ganesh et al.
2017/0181215 A1\* 6/2017 Gaur ..................... H04W 76/18

OTHER PUBLICATIONS

3rd Generation Partnership Project, Technical Specification 24.501, V15.3.0, Mar. 2019, 470 pages.
International Search Report and Written Opinion—PCT/US2020/023129—ISA/EPO—dated Aug. 17, 2020.

\* cited by examiner

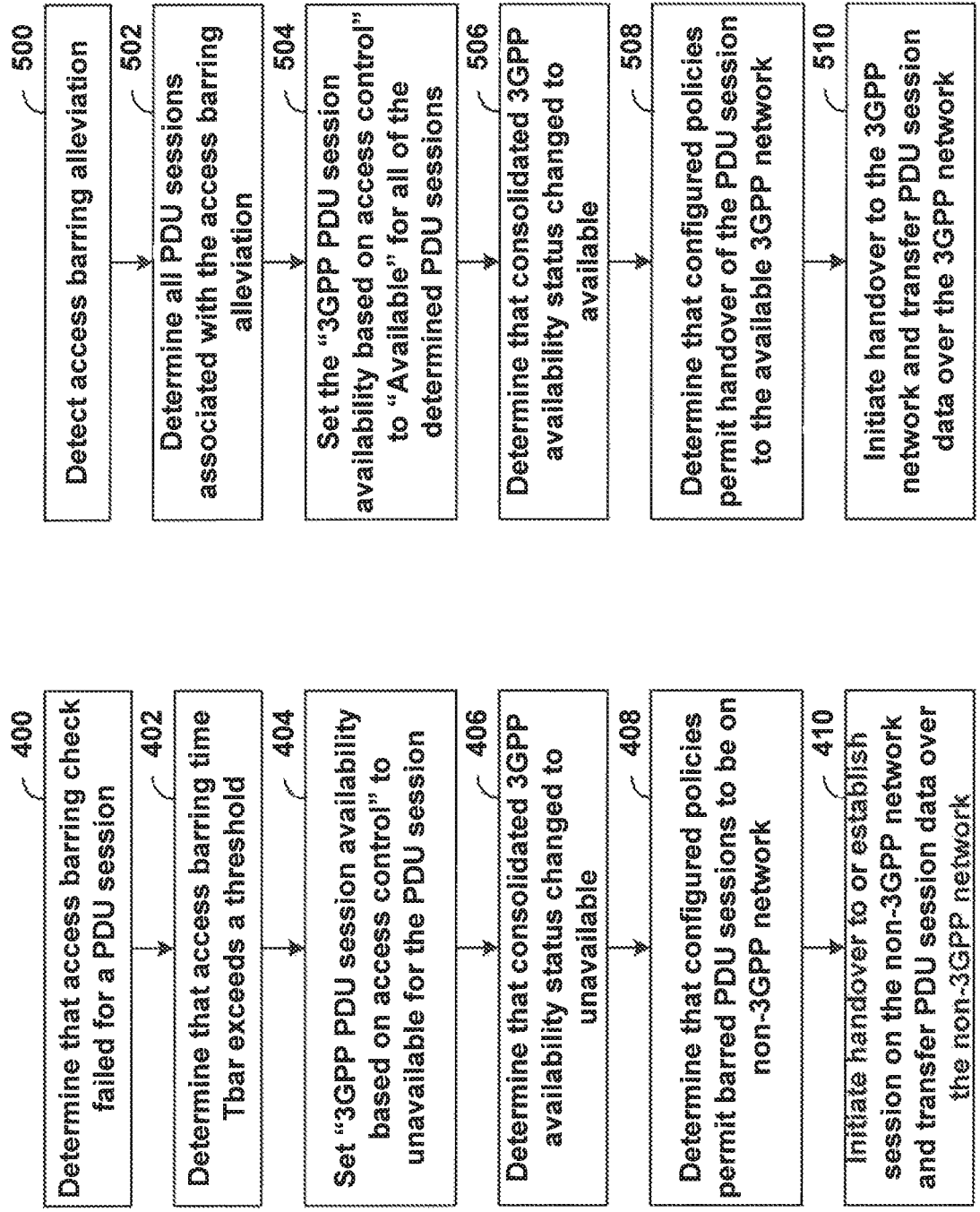

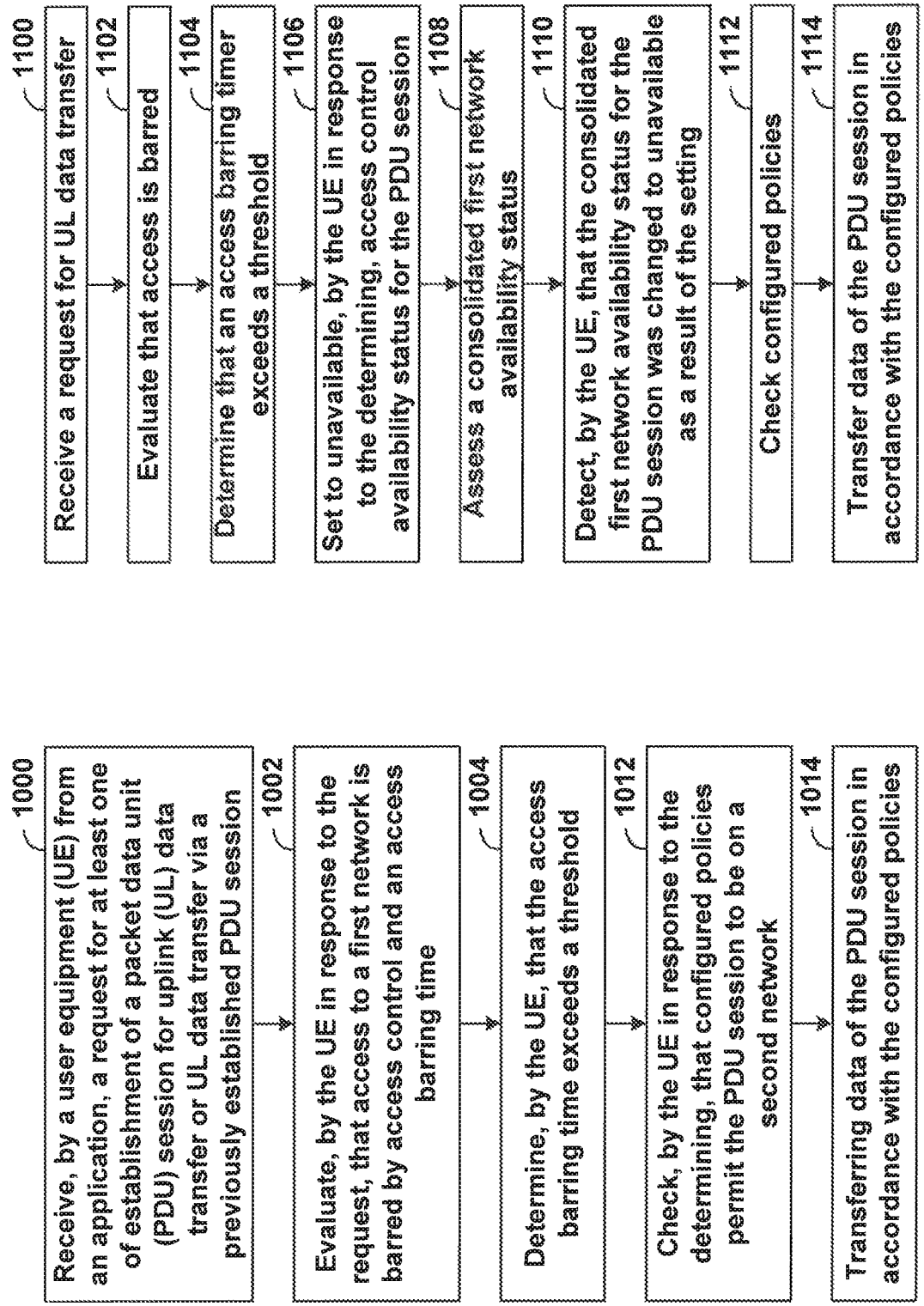

REDUCING DATA LATENCY WHEN CELLULAR ACCESS IS BARRED

TECHNICAL FIELD

Aspects of the present disclosure relate generally to wireless communication systems, and more particularly, to reducing data latency when access is barred. Certain embodiments of the technology discussed below can enable and provide handover to a non-cellular network, in accordance with configured policies (e.g., when cellular access is barred and/or a barring time exceeds a threshold).

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

BRIEF SUMMARY OF SOME EMBODIMENTS

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In an aspect, a method of performing wireless communication includes receiving, by a user equipment (UE) from an application, a request for at least one of establishment of a packet data unit (PDU) session or uplink (UL) data transfer via a previously established PDU session. The method can additionally include evaluating, by the UE in response to the request, that access to a first network (e.g., a 3rd Generation Partnership Project (3GPP) network or cellular network) is barred (e.g., by 3GPP access control and an access barring time). The method can also include determining, by the UE, that the access barring time exceeds a threshold, and checking, by the UE in response to the determining, that configured policies permit the PDU session to be on a second network (e.g., a non-3GPP network or non-cellular network). The method can further include transferring data of the PDU session in accordance with the configured policies.

In an aspect, a wireless communication apparatus has means for receiving, by a user equipment (UE) from an application, a request for one of establishment of a packet data unit (PDU) session or uplink (UL) data transfer through a previously established PDU session. The wireless communication apparatus additionally has means for evaluating, by the UE in response to the request, that access to a first network (e.g., a 3rd Generation Partnership Project (3GPP) network) is barred by 3GPP access control and an access barring time. The wireless communication apparatus also has means for determining, by the UE, that the access barring time exceeds a threshold, and means for checking, by the UE in response to the determining, that configured policies permit the PDU session to be on a second network (e.g., a non-3GPP network). The wireless communication apparatus further has means for transferring data of the PDU session in accordance with the configured policies.

In an aspect, a wireless communication apparatus has one or more computer processors and one or more memories coupled to the one or more computer processors. The one or more computer processors are configured to receive, by a user equipment (UE) from an application, a request for at least one of establishment of a packet data unit (PDU) session or uplink (UL) data transfer via a previously established PDU session. The one or more computer processors are additionally configured to evaluate, by the UE in response to the request, that access to a first network (e.g., a 3rd Generation Partnership Project (3GPP) network) is barred (e.g., by 3GPP access control and an access barring time). The one or more computer processors are also configured to determine, by the UE, that the access barring time exceeds a threshold, and check, by the UE in response to the determination, that configured policies permit the PDU session to be on a second network (e.g., a non-3GPP network). The one or more computer processors are further configured to transfer data of the PDU session in accordance with the configured policies.

In an aspect, a computer-readable medium has instructions recorded thereon that, when enacted by one or more computer processors, cause the one or more computer processors to receive, by a user equipment (UE) from an application, a request for at least one of establishment of a packet data unit (PDU) session or uplink (UL) data transfer via a previously established PDU session. The instructions additionally cause the one or more computer processors to evaluate, by the UE in response to the request, that access to a first network (e.g., a 3rd Generation Partnership Project (3GPP) network) is barred (e.g., by 3GPP access control and an access barring time). The instructions also cause the one or more computer processors to determine, by the UE, that the access barring time exceeds a threshold, and check, by the UE in response to the determining, that configured policies permit the PDU session to be on a second network (e.g., a non-3GPP network). The instructions further cause the one or more computer processors to transfer data of the PDU session in accordance with the configured policies.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments the exemplary embodiments can be implemented in various devices, systems, and methods.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIG. 4 is a block diagram conceptually illustrating example blocks of a method of performing wireless communications according to some embodiments of the present disclosure.

FIG. 5 is a block diagram conceptually illustrating example blocks of a method of performing wireless communications according to some embodiments of the present disclosure.

FIG. 10 is a block diagram conceptually illustrating example blocks of a method of performing wireless communications according to some embodiments of the present disclosure.

FIG. 11 is a block diagram conceptually illustrating example blocks of a method of performing wireless communications according to some embodiments of the present disclosure.

DETAILED DESCRIPTION

Figure 1:
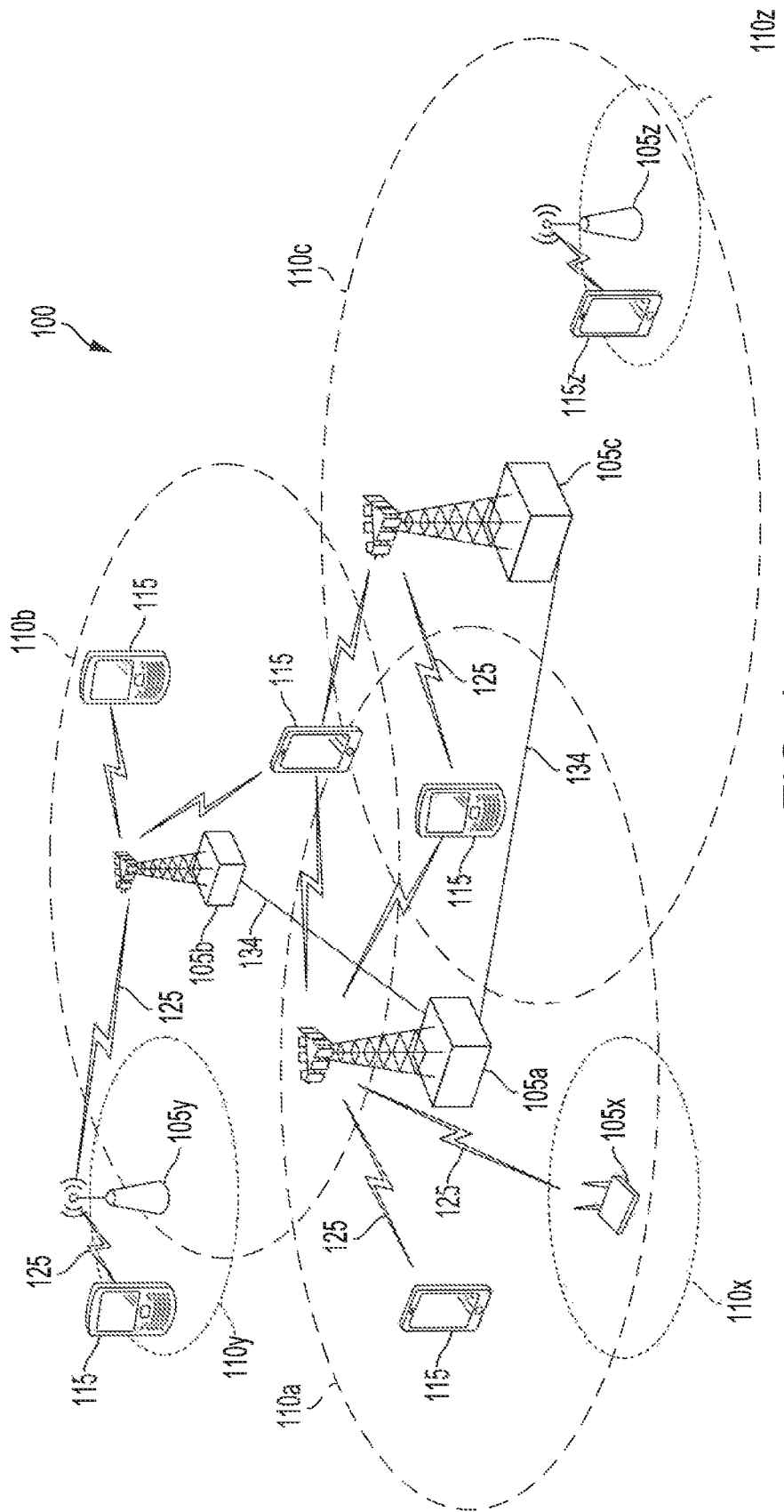
FIG. 1 is a block diagram illustrating details of a wireless communication system according to some embodiments of the present disclosure.

The detailed description set forth below, in connection with the appended drawings and appendix, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in communication as between two or more wireless devices in one or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks (sometimes referred to as "5G NR" networks/systems/devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as GSM. 3GPP defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with Universal Terrestrial Radio Access Networks (UTRANs) in the case of a UMTS/GSM network. An operator network may also include one or more LTE networks, and/or one or more other networks. The various different network types may use different radio access technologies (RATs) and radio access networks (RANs).

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1 M nodes/kn$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD)/frequency division duplex (FDD) design; and advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

For clarity, certain aspects of the apparatus and techniques may be described below with reference to exemplary LTE implementations or in an LTE-centric way, and LTE terminology may be used as illustrative examples in portions of the description below; however, the description is not intended to be limited to LTE applications. Indeed, the present disclosure is concerned with shared access to wireless spectrum between networks using different radio access technologies or radio air interfaces, such as those of 5G NR.

Moreover, it should be understood that, in operation, wireless communication networks adapted according to the concepts herein may operate with any combination of licensed or unlicensed spectrum depending on loading and availability. Accordingly, it will be apparent to one of skill in the art that the systems, apparatus and methods described herein may be applied to other communications systems and applications than the particular examples provided.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and/or other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or OEM devices or systems incorporating one or more described aspects. In some practical settings, devices incorporating described aspects and features may also necessarily include additional components and features for implementation and practice of claimed and described embodiments. It is intended that innovations described herein may be practiced in a wide variety of implementations, including both large/small devices, chip-level components, multi-component systems (e.g. RF-chain, communication interface, processor), distributed arrangements, end-user devices, etc. of varying sizes, shapes, and constitution.

FIG. 1 shows wireless network 100 for communication according to some embodiments. Wireless network 100 may, for example, comprise a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Wireless network 100 illustrated in FIG. 1 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station and/or a base station subsystem serving the coverage area, depending on the context in which the term is used. In implementations of wireless network 100 herein, base stations 105 may be associated with a same operator or different operators (e.g., wireless network 100 may comprise a plurality of operator wireless networks), and may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In other examples, each base station 105 and UE 115 may be operated by a single network operating entity.

A base station may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 115 are dispersed throughout the wireless network 100, and each UE may be stationary or mobile. It should be appreciated that, although a mobile apparatus is commonly referred to as user equipment (UE) in standards and specifications promulgated by the 3rd Generation Partnership Project (3GPP), such apparatus may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. Within the present document, a "mobile" apparatus or UE need not necessarily have a capability to move, and may be stationary. Some non-limiting examples of a mobile apparatus, such as may comprise embodiments of one or more of UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an "Internet of things" (IoT) or "Internet of everything" (IoE) device such as an automotive or other transportation vehicle, a satellite radio, a global positioning system (GPS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115a-115d of the embodiment illustrated in FIG. 1 are examples of mobile smart phone-type devices accessing wireless network 100 A UE may also be a machine specifically configured for connected communication, including machine type communication (MTC), enhanced MTC (eMTC), narrowband IoT (NB-IoT) and the like. UEs 115e-115k illustrated in FIG. 1 are examples of various machines configured for communication that access wireless network 100.

A mobile apparatus, such as UEs 115, may be able to communicate with any type of the base stations, whether macro base stations, pico base stations, femto base stations, relays, and the like. In FIG. 1, a lightning bolt (e.g., communication link) indicates wireless transmissions between a UE and a serving base station, which is a base station designated to serve the UE on the downlink and/or uplink, or desired transmission between base stations, and backhaul transmissions between base stations. Backhaul communication between base stations of wireless network 100 may occur using wired and/or wireless communication links.

In operation at wireless network 100, base stations 105a-105c serve UEs 115a and 115b using 3D beamforming and coordinated spatial techniques, such as coordinated multi-point (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

Wireless network 100 of embodiments supports mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through wireless network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. Wireless network 100 may also provide additional network efficiency through dynamic, low-latency TDD/FDD communications, such as in a vehicle-to-vehicle (V2V) mesh network between UEs 115i-115k communicating with macro base station 105e.

Figure 2:
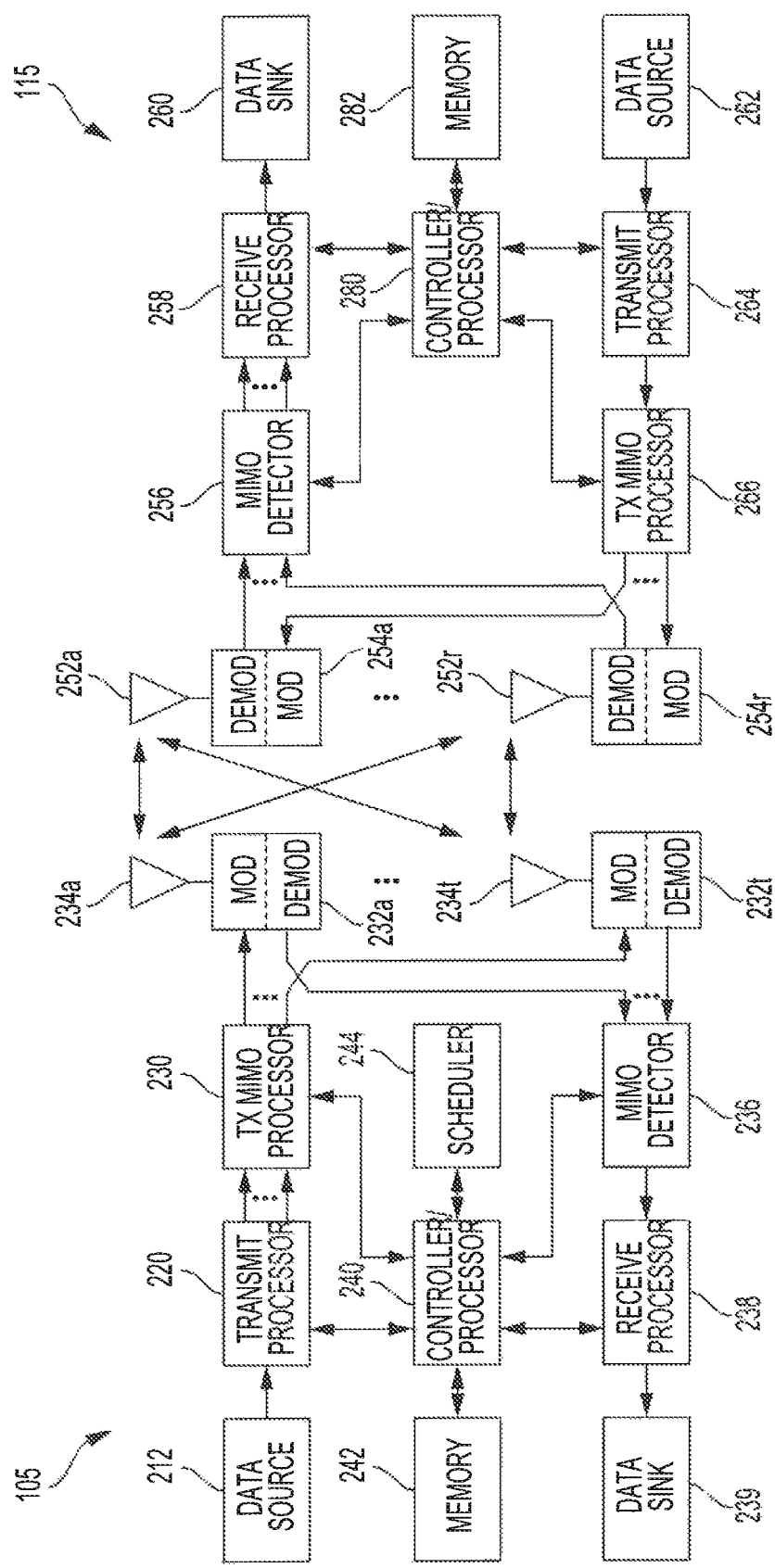
FIG. 2 is a block diagram conceptually illustrating a design of a base station and a UE configured according to some embodiments of the present disclosure.

FIG. 2 shows a block diagram of a design of a base station 105 and a UE 115, which may be any of the base stations and one of the UEs in FIG. 1. For a restricted association scenario (as mentioned above), base station 105 may be small cell base station 105f in FIG. 1, and UE 115 may be UE 115c or 115D operating in a service area of base station 105f, which in order to access small cell base station 105f, would be included in a list of accessible UEs for small cell base station 105f. Base station 105 may also be a base station of some other type. As shown in FIG. 2, base station 105 may be equipped with antennas 234a through 234t, and UE 115 may be equipped with antennas 252a through 252r for facilitating wireless communications.

At the base station 105, a transmit processor 220 may receive data from a data source 212 and control information from a controller/processor 240. The control information may be for the physical broadcast channel (PBCH), physical control format indicator channel (PCFICH), physical hybrid-ARQ (automatic repeat request) indicator channel (PHICH), physical downlink control channel (PDCCH), enhanced physical downlink control channel (EPDCCH), MTC physical downlink control channel (MPDCCH), etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the primary synchronization signal (PSS) and secondary synchronization signal (SSS), and cell-specific reference signal. Transmit (TX) multiple-input multiple-output (MIMO) processor 230 may perform spatial processing (e.g., precoding) on the data symbols, the control symbols, and/or the reference symbols, if applicable, and may provide output symbol streams to modulators (MODs) 232a through 232t. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232a through 232t may be transmitted via the antennas 234a through 234t, respectively.

At the UE 115, the antennas 252a through 252r may receive the downlink signals from the base station 105 and may provide received signals to the demodulators (DE-MODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254a through 254r, perform MIMO detection on the received symbols if applicable, and provide detected symbols. Receive processor 258 may process (e.g., demodulate, deinterleave, and decode) the detected symbols, provide decoded data for the UE 115 to a data sink 260, and provide decoded control information to a controller/processor 280.

On the uplink, at the UE 115, a transmit processor 264 may receive and process data (e.g., for the physical uplink shared channel (PUSCH)) from a data source 262 and control information (e.g., for the physical uplink control channel (PUCCH)) from the controller/processor 280. Transmit processor 264 may also generate reference symbols for a reference signal. The symbols from the transmit processor 264 may be precoded by TX MIMO processor 266 if applicable, further processed by the modulators 254a through 254r (e.g., for SC-FDM, etc.), and transmitted to the base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Processor 238 may provide the decoded data to data sink 239 and the decoded control information to controller/processor 240.

Controllers/processors 240 and 280 may direct the operation at base station 105 and UE 115, respectively. Controller/processor 240 and/or other processors and modules at base station 105 and/or controller/processor 28 and/or other processors and modules at UE 115 may perform or direct the execution of various processes for the techniques described herein, such as to perform or direct the execution illustrated in FIGS. 3-14, and/or other processes for the techniques described herein. Memories 242 and 282 may store data and program codes for base station 105 and UE 115, respectively. Scheduler 244 may schedule UEs for data transmission on the downlink and/or uplink.

Wireless communications systems operated by different network operating entities (e.g., network operators) may share spectrum. In some instances, a network operating entity may be configured to use an entirety of a designated shared spectrum for at least a period of time before another network operating entity uses the entirety of the designated shared spectrum for a different period of time. Thus, in order to allow network operating entities use of the full designated shared spectrum, and in order to mitigate interfering communications between the different network operating entities, certain resources (e.g., time) may be partitioned and allocated to the different network operating entities for certain types of communication.

For example, a network operating entity may be allocated certain time resources reserved for exclusive communication by the network operating entity using the entirety of the shared spectrum. The network operating entity may also be allocated other time resources where the entity is given priority over other network operating entities to communicate using the shared spectrum. These time resources, prioritized for use by the network operating entity, may be utilized by other network operating entities on an opportunistic basis if the prioritized network operating entity does not utilize the resources. Additional time resources may be allocated for any network operator to use on an opportunistic basis.

Access to shared spectrum and arbitration of time resources among different network operating entities can be achieved in various manner. For example, on approach may be centrally controlled by a separate entity, autonomously determined by a predefined arbitration scheme. Another approach may be dynamically determined based on interactions between wireless nodes of the network operators.

In some cases, UE 115 and base station 105 may operate in one or more shared radio frequency spectrum bands. These frequency spectrum bands may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen before talk (LBT) procedure such as a clear channel assessment (CCA) prior to communicating in order to determine whether the shared channel is available. A CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel and/or the acknowledge/negative-acknowledge (ACK/NACK) feedback for its own transmitted packets as a proxy for collisions.

Communication networks according to aspects and embodiments described herein (e.g., network 100) may use a number of factors for network access configurations. Depending on operator policies, deployment scenarios, subscriber profiles, and available services, different criteria may be used in determining which access attempt should be allowed or blocked when congestion occurs in a 5G System (5GS). 5GS can generally include a core network and a radio network. These different criteria for access control may be associated with Access Identities and Access Categories. The 5G system may, thus, provide a single unified access control where operators control accesses.

In unified access control (UAC), each access attempt is categorized into one or more of the Access Identities and one of the Access Categories. Based on access control information applicable for the corresponding Access Identity and Access Category of the access attempt, a UE can perform a test of whether an actual access attempt can be made. The unified access control framework may be applicable both to UEs accessing a 5G core network using E-UTRA and to UEs accessing a 5G core network using NR. When a UE wants to access the 5G system, the UE first performs access control checks to determine if the access is allowed.

Access control checks can generally be performed for access attempts. In attempting these checks, UEs may implement a variety of procedures as described in TS 24.501 for 5G. A sample set of procedures is defined by the following list of events:

a) the UE is in 5G mobility management (5GMM)-IDLE mode over 3GPP access and an event that requires a transition to 5GMM-CONNECTED mode occurs; and b) the UE is in 5GMM-CONNECTED mode over 3GPP access or 5GMM-CONNECTED mode with radio resource control (RRC) inactive indication and one of the following events occurs:

1) 5GMM receives a mobile originated (MO) multi-media telephony (MO-MMTEL)-voice-call-started indication, an MO-MMTEL-video-call-started indication or an MO-SMS over IP (SMSoIP)-attempt-started indication from upper layers;
2) 5GMM receives a request from upper layers to send a mobile originated SMS over NAS unless the request triggered a service request procedure to transition the UE from 5GMM-IDLE mode to 5GMM-CONNECTED mode;
3) 5GMM receives a request from upper layers to send an UL NAS TRANSPORT message for the purpose of packet data unit (PDU) session establishment unless the request triggered a service request procedure to transition the UE from 5GMM-IDLE mode to 5GMM-CONNECTED mode;
4) 5GMM receives a request from upper layers to send an UL NAS TRANSPORT message for the purpose of PDU session modification unless the request triggered a service request procedure to transition the UE from 5GMM-IDLE mode to 5GMM-CONNECTED mode;
5) 5GMM receives a request to re-establish the user-plane resources for an existing PDU session; and
6) 5GMM is notified that an uplink user data packet is to be sent for a PDU session with suspended user-plane resources.

If the lower layers indicate that the access attempt is barred, the network access stratum NAS does not initiate the procedure to send the initial NAS message for the access attempt.

Figure 3:
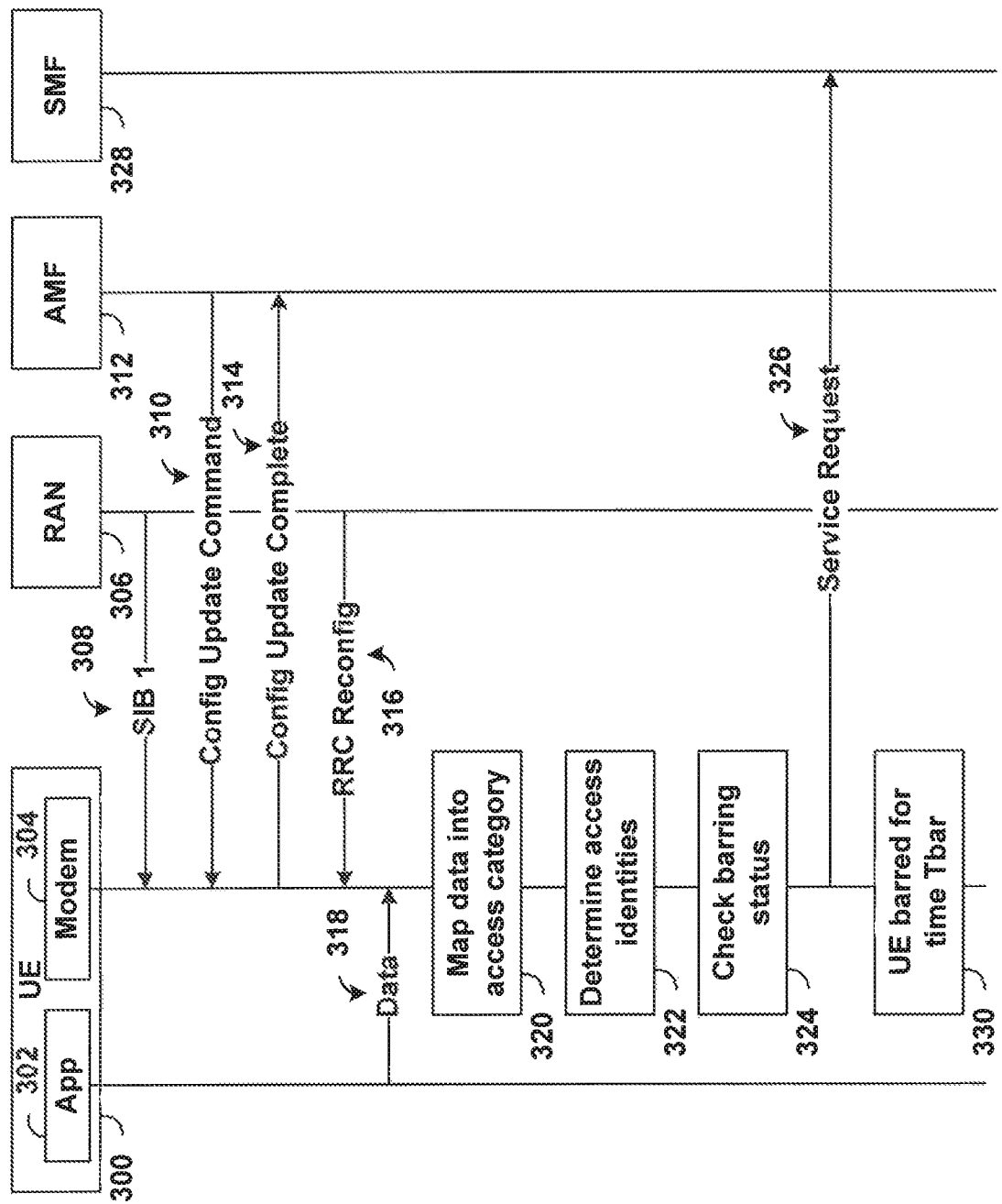
FIG. 3 is a signaling diagram conceptually illustrating wireless communications according to some embodiments of the present disclosure.

Referring to FIG. 3, a UAC procedure occurs under a precondition that a UE 300, such as UE 115, has established at least one PDU session. Whenever a UE sends data (e.g., voice call or internet or sms), it requires a "PDU session". For example, for the case of voice call, typically an IP Multimedia Subsystem (IMS) PDU session is established at UE power up and usually not released (even if the radio resource is released). Such a PDU session provides, for example, an IP address to the UE and security/ciphering/authentication info of the UE to use the dedicated voice call functionality from the operator, or connects the UE to a dedicated network (e.g., IMS network). When the UE is in the RRC_Connected state and all data resource bearers (DRBs) of an existing PDU session have been released due to user plane selective deactivation, a UE application 302 (e.g., voice call dialer Application on smartphone, short message service (SMS) application on smartphone, Multimedia Messaging Service (MMS) application on smartphone, etc.) sends UL data 318 through the PDU session enacted by modem 304. Other possible triggers (e.g., UE is in RRC_Idle or RRC_Inactive state) are not illustrated by this call flow yet may be used in some embodiments.

FIG. 3 illustrates a detailed example of the UAC call flow procedure, but RRC and backhaul transport messages are skipped in the call flow. A UE 300 receives network broadcast signaling (e.g., system information block in 4G and 5G) for access control parameters. For example, at 308, the UE reads system information block one (SIB1) from the radio access network (RAN) 306 upon cell selection/reselection. SIB1 contains UAC barring parameters per access category. The Access and Mobility Management Function (AMF) 312 may optionally send a NAS message CONFIGURATION UPDATE COMMAND 310 with information element (IE) "Operator-defined access category definitions" to the UE 300. The UE 300 responds by sending a CONFIGURATION UPDATE COMPLETE message 314 to acknowledge the AMF 312. The UE 300 receives a RRCReconfiguration message 316 from RAN 306 which releases all DRBs of one of the PDU sessions.

At 320 the UE application 302 sends data 318 through the PDU session with no configured DRB. The UE 300 maps the application data arrival event into one access category (either standardized or operator-defined, but not both). At 322, the UE determines its access identities. How to determine access identities and access category of the UE 300 is described in TS 24.501 for 5G. At 324, the UE RRC performs a barring check based on one or more of determined access identities and the access category. The barring check is a procedure described by RRC spec 38.331 for 5G. In SIB1, if one of the UE 300 determined "access identity—access category" combinations is allowed, then the access attempt is allowed. Otherwise, then the UE 300 draws a random number 'rand' uniformly distributed in the range: 0≤rand<1. If 'rand' is lower than the uac-BarringFactor of the access category as indicated in SIB1, then the UE 300 may consider the access attempt as allowed. Otherwise, the considers access attempt to the cell as barred.

If the access attempt to the cell is allowed, the UE 300 continues onward with next steps. This can include the UE 300 sending a service request 326, after which the network establishes DRBs for the UE 300 to send the data. Otherwise, the UE is barred at 330 for a random time Tbarring which is generated based on SIB1 configuration for the UE determined access category. A maximum allowed Tbarring value may be 665.6 seconds (i.e., (0.7+0.6)*512) though other time values or ranges may be used considering system operational characteristic and design parameters. If the access to the cell is barred, the UE is barred for a random time (e.g., based on an RRC barring timer). Upon RRC barring timer expiry, the UE may restart the Access barring checking if the UE still wants to retry the access attempt.

Features such as those of ePDG, N3IWF can connect UE to the operator core network via WiFi. Hence, voice calls over internet protocol multimedia subsystem (IMS) and multimedia messaging service (MMS) can be provided over WiFi using features like those of Evolved Packet Data Gateway (ePDG) and/or Non-3GPP InterWorking Function (N3IWF). The present disclosure sets forth techniques and procedures to connect the UE 300 to a network operator's core network when cellular access is barred. Some current smart phones can automatically switch to WiFi only when the cellular signal is weak yet remain on cellular access when the cellular signal is strong and cellular access barred.

A problem addressed by the present disclosure is that, when a UE wants to use cellular networks (e.g., 5G, LTE, or other networks defined by 3GPP protocols), it is subject to access barring. The cellular access barring time can be very long, e.g., for 5G UAC, it can be more than a predetermined threshold (e.g., ten minutes). Moreover, after the barring time, the UE may be barred again consecutively. Current cellular communication systems including 5G and LTE use access barring, e.g., to mitigate network congestion. Most UEs have both WiFi and cellular access. WiFi networks typically do not utilize access barring. Generally, current UEs can automatically switch to WiFi only when a cellular signal is weak (or otherwise undesired), yet can remain on cellular access when the cellular signal is strong and cellular access barred.

Aspects and solutions set forth in the present disclosure enable and provide procedures for communication devices (e.g., UEs) to determine access possibilities between varying networks (e.g., a first network and a second network). For example, in scenarios where a PDU session is barred by 3GPP access, a UE can check policies to determine or observe if a PDU session is allowed to be handed over to non-3GPP access. Policy checks may generally involve comparing a potential PDU hand over option against a set of rules, contingent conditions, or other operational policies in determining if a potential hand over is allowed and/or viable. In some scenarios, some services (e.g., voice over IMS, MMS) require operators' core network support (e.g., ePDG/N3IWF), and regular WiFi without using ePDG/N3IWF cannot connect a UE to the operators' core network. Additionally, blind handover to WiFi using ePDG/N3IWF may violate operator policies (e.g., UE Route Selection Policy (URSP), Access Network Discovery and Selection Function (ANDSF)). As discussed herein, proposed solutions can include a series of logic checks or process flows (e.g., three algorithms discussed below) to implement policy check procedures for network access that address these considerations.

Referring to FIG. 4, a first of the three algorithms involves handover from 3GPP access to non-3GPP access per PDU session. Beginning at block 400 a UE, such as UE 115 and/or UE 300, determines if an access barring check bars an access attempt of UL application data transfer request or PDU session establishment request. Processing may proceed from block 400 to block 402.

At block 402, the UE may determine that a barring time Tar exceeds a threshold. Processing may proceed from block 402 to block 404.

At block 404, the UE may, in response to determining that access is barred at block 400 and the threshold is exceeded at block 402, set a variable "3GPP PDU session availability based on access control" to "Unavailable" only for the PDU session associated with the barred access attempt. The granularity of "3GPP PDU session availability based on access control" may be per PDU session or per {DNN, S-NSSAI} combination. Processing may proceed from block 404 to block 406.

At block 406, the UE may determine a consolidated 3GPP availability status using a third algorithm described below with respect to FIGS. 6-8. Block 406 may include determining that the setting at block 404 caused the consolidated status to change to unavailable. For example, the UE may archive a previous consolidated 3GPP availability status and compare it to the new consolidated 3GPP availability status to see if it has changed. Alternatively or additionally, the UE may check if another variable "3GPP PDU session availability based on non-access control aspects" is already set to unavailable, in which case the consolidated status would not be changed by setting the other variable to unavailable. Alternatively or additionally, the UE may, at block 404, check to see if the access control status is already unavailable and, if so, "set" the status by allowing it to remain unchanged, and concurrently determine, at block 406, that the consolidated status remains unchanged. In another alternative, processing may not include block 406, but rather proceed from block 404 to block 408. Otherwise, processing may proceed from block 406 to block 408.

At block 408, if the calculated consolidated 3GPP availability status changes from "available" to "unavailable," then the UE may take further action. For example, a UE can evaluate operational rules to determine compliance with a set of predetermined policies. Such policies may be termed (e.g., configured policies herein and can include an array of provisioned or updated operational policies. The configured policies may be stored at the UE, and may be used by the UE though configured policies may originate from other components (such as a base station or other network devices). Samples of configured policies include UE Route Selection Policy (URSP), (e.g., sent by a network to the UE via Network Access Stratum (NAS) signaling and Access Network Discovery and Selection Function (ANDSF)) to determine whether the UE can handover the barred PDU session to the available non-3GPP access (e.g., via ePDG or N3IWF over WiFi), or establish the new, barred PDU session on the non-3GPP access. For example, such URSP and/or ANDSF policies may indicate whether a specific PDU session can be on 3GPP, or on non-3gpp. Accordingly, a policy can allow both handover and new PDU session establishment of a specific PDU session on 3GPP, as long as the PDU session is allowed on 3GPP; a policy can also allow both handover and new PDU session establishment of a specific PDU session on non-3GPP, as long as the PDU session is allowed on non-3GPP. Checking whether the status changed at block 406 advantageously avoids the UE checking the policies unnecessarily, such as if the policies were already checked by the UE on a previous iteration which was triggered by e.g., "non Access control 3GPP availability status" being set to "unavailable" due to e.g., very low signal strength. Processing may proceed from block 408 to block 410.

At block 410, if the evaluation result allows, the UE may handover the barred PDU session to non-3GPP access (e.g., via ePDG or N3IWF over WiFi) or establish the new PDU session on the non-3GPP access network. Then the UE can transfer the data of the PDU session over non-3GPP access. After block 410, processing may end. Alternatively or additionally, processing may return to an earlier point in the process. Further still, processing may proceed from block 410 to a second algorithm described below with reference to FIG. 5.

Referring to FIG. 5, a second of the three algorithms involves handover from non-3GPP access to 3GPP access per PDU session. Beginning at block 500, the UE, such as UE 115 and/or UE 300, detects access barring alleviation due to, for example, barring timer expiry or stopping. Processing may proceed from block 500 to block 502.

At block 502, the UE may respond to the detected access barring alleviation by determine which PDU sessions are associated with this barring alleviation. Processing may proceed from block 502 to block 504.

At block 504, the UE may set the "3GPP PDU session availability based on access control" to "Available" for all the PDU sessions determined at block 502. Processing may proceed from block 504 to block 506.

At block 506, the UE may determine, for each of the PDU sessions determined at block 502, a consolidated 3GPP availability status using the third algorithm described below with respect to FIGS. 6-8. Block 506 may include determining that a setting at block 504 caused the consolidated status to change (e.g., to available in a manner similar to that described above with reference to block 406 of FIG. 4). For example, in some scenarios, a UE may archive a previous consolidated 3GPP availability status and compare it to a new consolidated 3GPP availability status to see if it has changed. For example, the status may not change in the event that a previous attempt was made to transmit the data, but access was barred, or if the signal strength was too low for 3GPP access. Determining that a previous setting did not change can reduce unnecessary UE actions triggered by the new setting. For example, if the previous setting is the same as the new one, the UE should not take further actions, because any actions should have already been taken when the UE made the previous setting. Alternatively or additionally, the UE may check if the other variable "3GPP PDU session availability based on non-access control aspects" is already set to unavailable, in which case the consolidated status would not be changed to available by setting "the 3GPP PDU session availability based on access control" to available. Alternatively or additionally, the UE may, at block 504, check to see if the status "the 3GPP availability based on access control" is already available and, if so, "set" the status by allowing it to remain unchanged, and concurrently determine, at block 506, that the consolidated status remains unchanged. Processing may proceed from block 506 to block 508.

At block 508, for each PDU session for which a calculated consolidated 3GPP availability status changed from "unavailable" to "available," a UE may evaluate the configured policies at the UE (e.g., URSP, ANDSF). Example techniques for calculation of the consolidated 3GPP status is detailed below with reference to FIGS. 6-8. This evaluation can be used to determine whether the UE can handover the PDU session to the available 3GPP access (e.g., 5G NR, LTE). Processing may proceed from block 508 to block 510.

Figure 9:
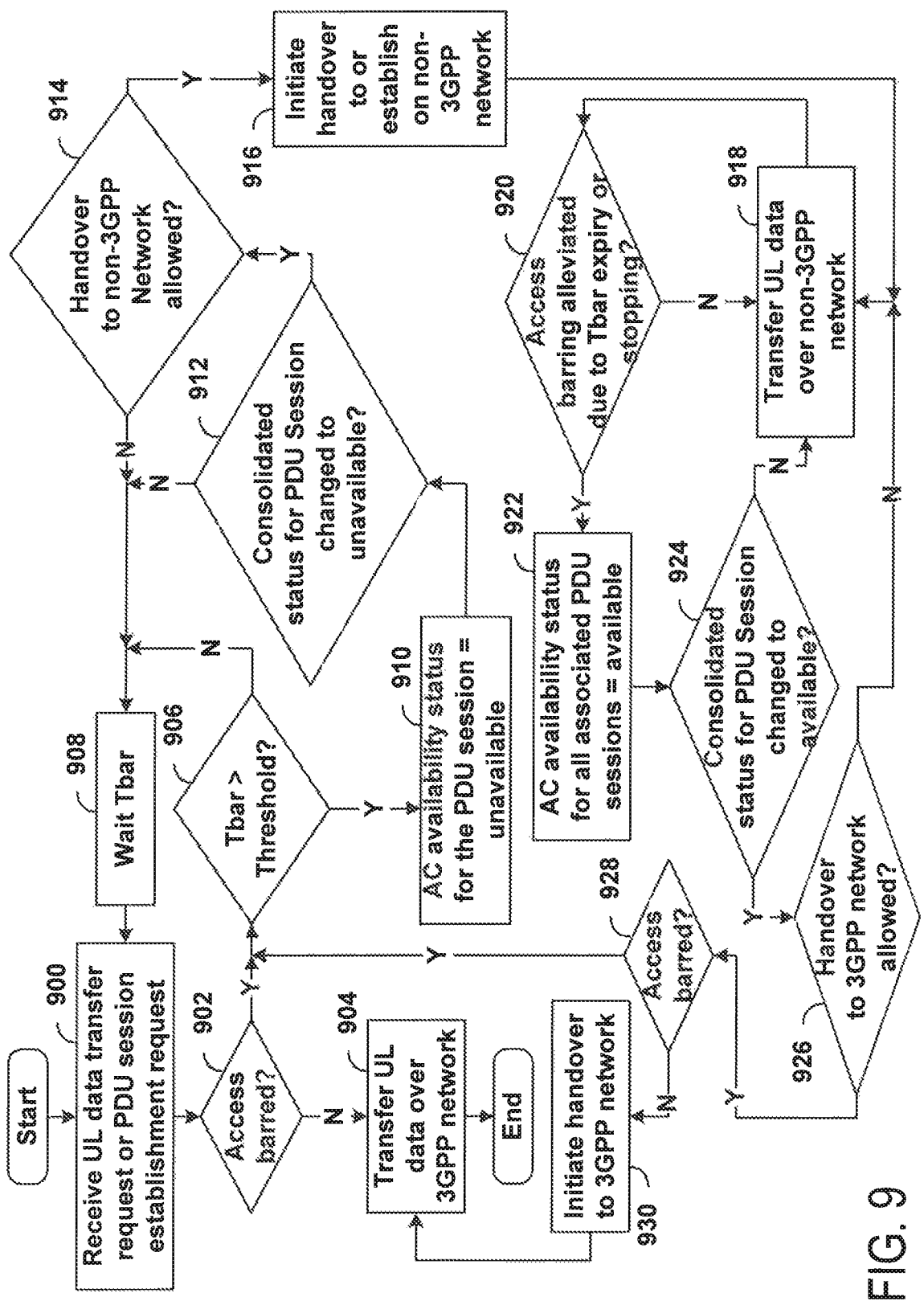
FIG. 9 is a block diagram conceptually illustrating example blocks of a method of performing wireless communications according to some embodiments of the present disclosure.

At block 510, if the evaluation result allows, the UE may attempt to handover the PDU session to the available 3GPP access (e.g., 5G NR, LTE). The handover attempt may be subject to a network access barring check (e.g., a 3GPP-network access barring check). For example, the access barring check may be the cellular access barring mechanism defined in UAC, or any cellular access control mechanism, such as LTE access control and/or access control in other cellular communications technologies. If the check result allows the access attempt, then the handover is performed, and the UE can transfer the data of the PDU session over 3GPP access. Otherwise, the UE does not perform handover for the PDU session. Instead the first algorithm may be invoked as illustrated in FIG. 9. Accordingly, processing may proceed from block 510 to an earlier point in the process. Alternatively or additionally, processing may end. Still further, processing may proceed from block 510 to the first algorithm described above with respect to FIG. 4.

Figure 6:
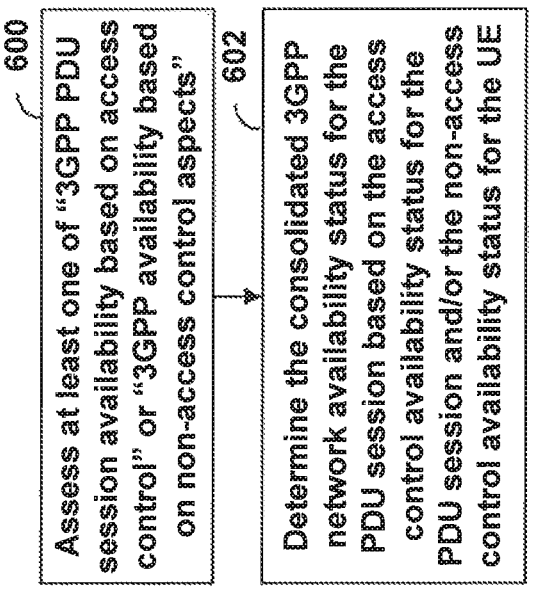
FIG. 6 is a block diagram conceptually illustrating example blocks of a method of performing wireless communications according to some embodiments of the present disclosure.

Turning now to FIG. 6, a third algorithm used to evaluate the consolidated 3GPP availability status begins at block 600 by the UE. Here a UE, such as UE 115 and/or UE 300, can assess at least one of "3GPP PDU session availability based on access control" or "3GPP availability based on non-access control aspects" for a proper assessment. The evaluation may be carried out as described below with respect to FIGS. 7 and 8. For example, the consolidated status may be determined to be available only if both the "3GPP PDU session availability based on access control" and the "3GPP availability based on non-access control aspects" are available. Accordingly, if either of these statuses is unavailable, then the consolidated status is also determined to be unavailable. Accordingly, in the event that a status (e.g., access control status or non-access control status) that is evaluated first is set to unavailable, the UE may determine the consolidated status as unavailable without need to evaluate the other status (access control status or non-access control status). Processing may proceed from block 600 to block 602.

At block 602, the UE may determine the consolidated 3GPP network availability status for the PDU session based on the access control availability status for the PDU session and/or the non-access control availability status for the UE. After block 602, processing may end.

Figure 7:
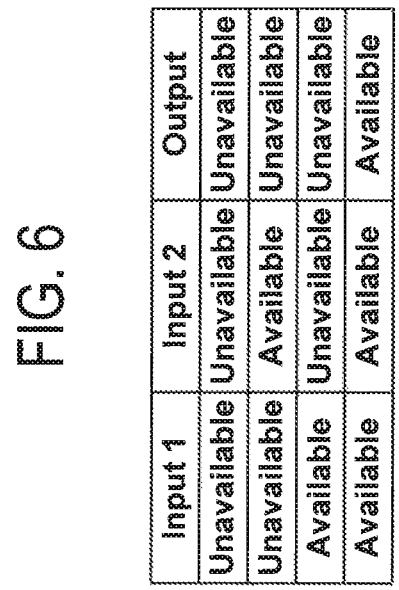
FIG. 7 is a graphical illustration providing an example of a truth table employed by or implemented according to one or more methods of performing wireless communications according to some embodiments of the present disclosure.

Referring now to FIG. 7, a truth table may be used to implement one or more of the logic checks or process flows. For example, the truth table may be utilized in carrying out or implementing the third algorithm. A first column provides a first input, which may correspond to the 3GPP PDU session availability based on access control (granularity: per PDU session). A second column provides a second input, which may correspond to 3GPP availability based on non-access control aspects (e.g., 3GPP access' signal strength), granularity: per UE. A third column provides an output corresponding to the consolidated 3GPP PDU session availability (granularity: per PDU session). The output is "available" only if both inputs are "available." The output is "unavailable" if one or both inputs are "unavailable."

Figure 8:
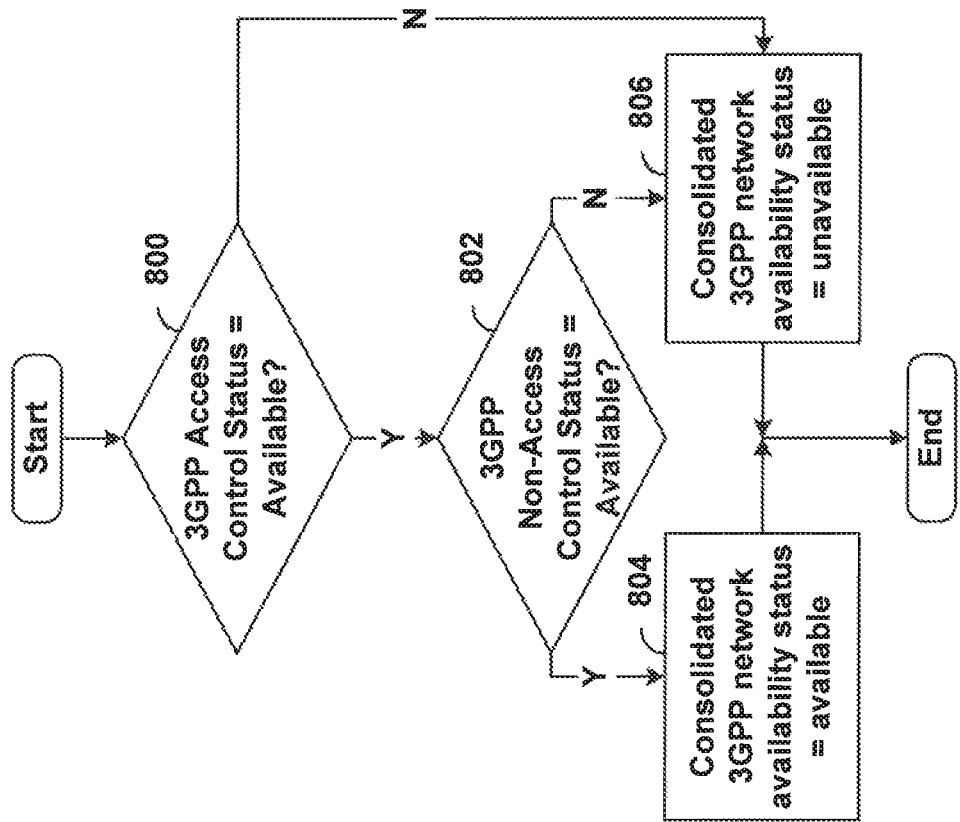
FIG. 8 is a block diagram conceptually illustrating example blocks of a method of performing wireless communications according to some embodiments of the present disclosure.

Referring to FIG. 8, logic implementing the truth table of FIG. 7 begins at block 800, at which a determination is made whether the 3GPP access control status is available. If so, then processing may proceed from block 800 to block 802. If not, then processing may proceed from block 800 to block 806.

At block 802, a determination is made whether the 3GPP non-access control status is available. If so, then processing may proceed from block 802 to block 804. If not, then processing may proceed from block 802 to block 806.

At block 804, a determination is made that the consolidated 3GPP status is available. Processing may return from block 804 to whichever of the first or second algorithms invoked the third algorithm. Alternatively or additionally, processing may return from block 804 to an earlier point in the process for evaluation with respect to another PDU session.

At block 806, a determination is made that the consolidated 3GPP status is unavailable. Processing may return from block 806 to whichever of the first or second algorithms invoked the third algorithm. Alternatively or additionally, processing may return from block 804 to an earlier point in the process for evaluation with respect to another PDU session.

In FIG. 8, it should be understood that the processing carried out at block 802 may instead be carried out in block 800, and that the processing in block 800 may thus be carried out in block 802. Stated differently, the process may first determine whether the 3GPP non-access control status is available, and only assess the 3GPP access control status if the 3GPP non-access control status is available. As such, it should be appreciated that a UE may only evaluate one of these statuses in the process of determining that the consolidated status is unavailable, and either of the access control or non-access control availability statuses may be evaluated first.

Turning now to FIG. 9, an example of operation in 5G according to interaction of the three algorithms is provided. Beginning at block 900, the UE, such as UE 115 and/or UE 300, receives an UL data transfer request or PDU session establishment request from an application that wants to send an UL data burst in RRC_Idle mode, and a traffic descriptor is "DNN=DNN1." A matched URSP Rule1 contains two routes, in which Route1 is of higher priority and is selected.

Route1: Precedence=5, AccessTypePreference=3GPP, DNN=DNN1, S-NSSAI=S-NSSAI-a

Route2: Precedence=8, AccessTypePreference=non-3GPP, DNN=DNN1, S-NSSAI=S-NSSAI-a In this first attempt, the UE attempts Route1, the access barring check passes at block 902, and the data burst is sent via Route1 (3GPP access) at block 904, after which the UE returns to the RRC_Idle state.

Subsequently, the application wants to send another UL data burst in RRC_Idle mode, and the data directly goes through the Route1 that was selected previously (without URSP evaluation). The access barring check at block 902 bars the access attempt for 100 seconds which is determined at block 906 to be more than a threshold (Note: UAC barring decision is randomized). If the access barring time were less than the threshold, then the UE would proceed to block 908 and wait for the access barring timer Tbar to expire. In this example, the threshold is exceeded, so processing proceeds to block 910.

At block 910, the UE sets the "3GPP PDU session availability based on access control" to "Unavailable" only for the {DNN1, S-NSSAI-a} combination associated with the barred PDU session. The UE then calculates the consolidated 3GPP availability status at block 912. If the calculated consolidated 3GPP availability status is determined to have changed at block 912, then the UE is triggered, at block 914, to evaluate one or more next available routes in a matched URSP rule (Route2 in Rule1). Since the UE is already connected to WLAN, the UE, at block 916, establishes the new PDU session over non-3GPP access (ePDG/EPC) or hands over the previously established PDU session from 5G to non-3GPP access (ePDG/EPC). The UE can then transfer the data of the PDU session over non-3GPP access at block 918.

While processing at block 918, if the UE detects access barring alleviation due to access barring timer expiry at block 920, then the UE proceeds to block 922. At block 922, the UE determines which PDU sessions are associated with the barring alleviation and sets the "3GPP PDU session availability based on access control" to "Available." For example, the UE may set this access control status to available for each {DNN1, S-NSSAI-a} combination used by the determined PDU sessions. The UE may then calculate the consolidated 3GPP availability status at block 924 and, if the calculated consolidated 3GPP availability status changes, this change triggers URSP re-evaluation at block 926. The existing PDU session over non-3GPP access from the previous step is on the lower-priority route (Route2 in Rule1), so the URSP re-evaluation triggers the UE to handover the PDU session to the higher-priority 3GPP access (Route1 in Rule1) at block 930 if an access barring check at block 928 is successful.

Exemplary benefits realized by embodiments and proposed solutions disclosed herein include improved ability for a UE to obtain service. For example, if the UE is barred in a congested cellular network with good signal strength, the UE can still obtain service (e.g., voice over IMS, MMS) over non-3GPP access/WiFi through ePDG/N3IWF. In contrast, without the disclosed solutions, if the UE is barred in a congested cellular network with good signal strength, the UE has to wait for a long time (e.g., up to ten minutes) for services (e.g., voice over IMS, MMS).

Referring now to FIG. 10, a method of wireless communication implements procedures as previously described. Such a method can begin at block 1000 by receiving, from an application by a user equipment (UE), such as UE 115 and/or UE 300, a request for at least one of establishment of a packet data unit (PDU) session or uplink (UL) data transfer via a previously established PDU session. Processing may proceed from block 1000 to block 1002.

At block 1002, the method proceeds by evaluating, by the UE in response to the request, that access to a 3$^{rd}$ Generation Partnership Project (3GPP) network is barred by 3GPP access control and an access barring time. Processing may proceed from block 1002 to block 1004.

At block 1004, the method proceeds by determining, by the UE, that the access barring time exceeds a threshold. Processing may proceed from block 1004 to block 1012.

At block 1012, processing may proceed by checking, by the UE in response to the determining, that configured policies permit the PDU session to be on a non-3GPP network. Processing may proceed from block 1012 to block 1014.

At block 1014, processing may proceed by transferring data of the PDU session in accordance with the configured policies. For example, block 1014 may include initiating handover, by the UE, to the non-3GPP network in response to a determination that the configured policies permit handover of the previously established PDU session to the non-3GPP network, and transferring UL and downlink (DL) data for the PDU session over the non-3GPP network. In another example, block 1014 may include initiating new PDU session establishment, by the UE, to the non-3GPP network in response to a determination that the configured policies permit the PDU session to be on the non-3GPP network, and transferring UL and downlink (DL) data for the PDU session over the non-3GPP network. After block 1014, processing may end. Alternatively or additionally, processing may return to an earlier point in the process.

Referring now to FIG. 11, another method of wireless communication implements procedures as previously described, and includes blocks 1100-1104, 1112, and 1114, which correspond to blocks 1000-1014 as described above with respect to FIG. 10. However, in FIG. 11, block 1104 proceeds to block 1106, at which processing continues by setting to unavailable, by the UE, such as UE 115 and/or UE 300, in response to the determining, access control availability status for the PDU session. Processing may proceed from block 1106 to block 1108.

At block 1108, processing continues by assessing a consolidated 3GPP network availability status. Block 1108 may include assessing at least one of the access control availability status for the PDU session or a non-access control availability status for the UE, and determining the consolidated 3GPP network availability status for the PDU session based on at least one of the access control availability status for the PDU session or the non-access control availability status for the UE. The determining the consolidated 3GPP network availability status may include determining that the consolidated 3GPP availability status for the PDU session is unavailable in response to assessment that either the access control availability status is unavailable, or the non-access control availability status is unavailable. Processing may proceed from block 1108 to block 1110.

At block 1110, processing continues by detecting, by the UE, that the consolidated 3GPP network availability status for the PDU session was changed to unavailable as a result of the setting. Processing may proceed from block 1110 to block 1112, at which the checking occurs in response to the detecting.

Figure 12:
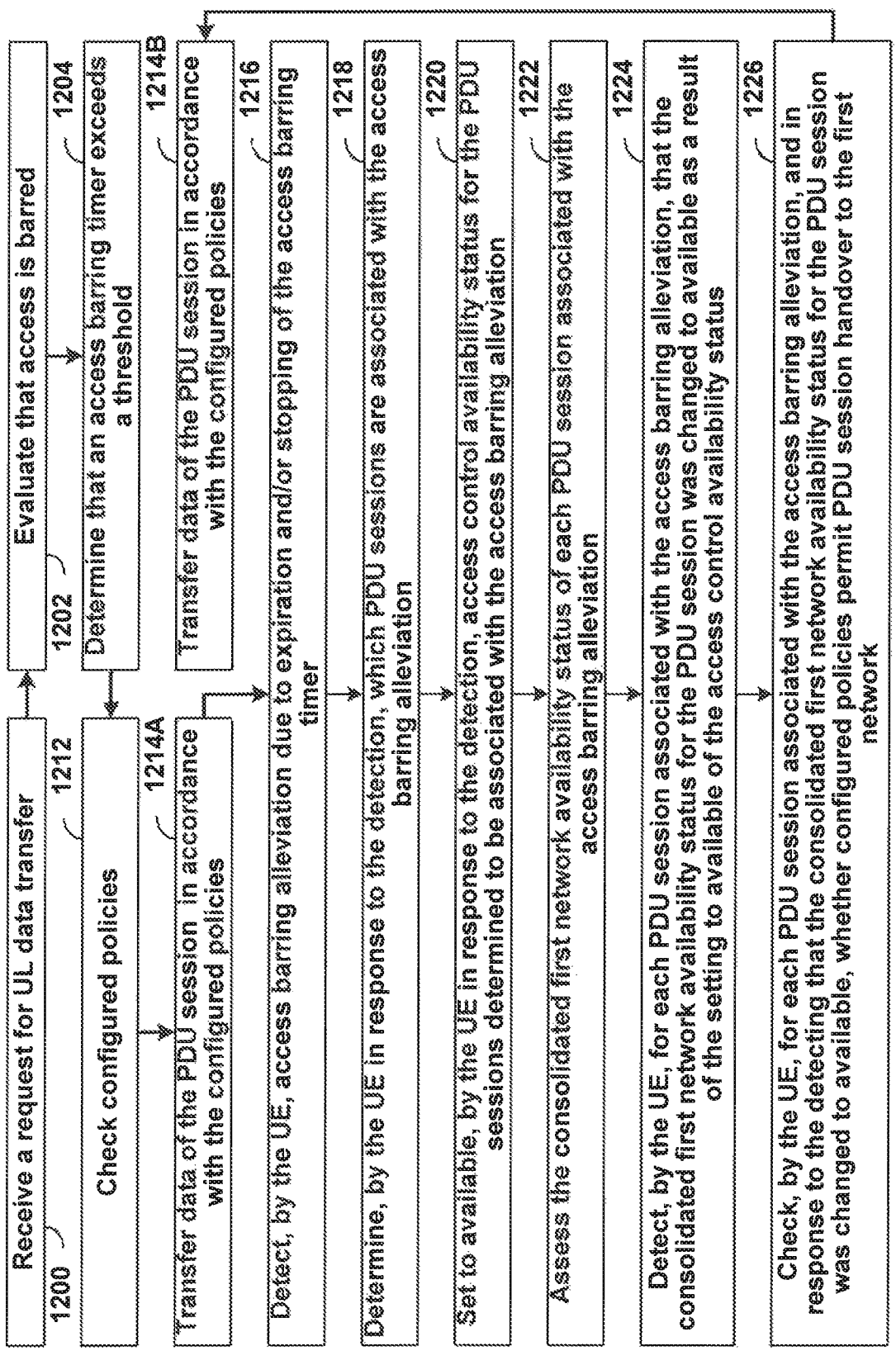
FIG. 12 is a block diagram conceptually illustrating example blocks of a method of performing wireless communications according to some embodiments of the present disclosure.

Turning now to FIG. 12, another method of wireless communication implements procedures as previously described, and includes blocks 1200-1204, 1212, and 1214A, which correspond to blocks 1000-1014 as described above with respect to FIG. 10. However, in FIG. 12, block 1214A proceeds to block 1216, at which processing continues by detecting, by the UE, such as UE 115 and/or UE 300, access barring alleviation due to at least one of expiration or stopping of the access barring timer. Processing may proceed from block 1216 to block 1218.

At block 1218, processing continues by determining, by the UE in response to the detecting, which PDU sessions are associated with the access barring alleviation. Processing may proceed from block 1218 to block 1220.

At block 1220, processing continues by setting to available, by the UE in response to the detecting, access control availability status for the PDU sessions determined to be associated with the access barring alleviation. Processing may proceed from block 1220 to block 1222.

At block 1222, processing continues by assessing the consolidated 3GPP network availability status of each PDU session associated with the access barring alleviation. Processing may proceed from block 1222 to block 1224.

At block 1224, processing continues by detecting, by the UE, for each PDU session associated with the access barring alleviation, that the consolidated 3GPP network availability status for the PDU session was changed to available as a result of the setting to available of the access control availability status. Processing may proceed from block 1224 to block 1226.

At block 1226, processing continues by checking, by the UE, for each PDU session associated with the access barring alleviation, and in response to the detecting that the consolidated 3GPP network availability status for the PDU session was changed to available, whether configured policies permit the PDU session to be on the 3GPP network. Processing returns from block 1226 to block 1214B, at which the UE transfers data in accordance with the configured policies. For example, performing the transfer of data may include initiating handover, by the UE, for each PDU session associated with the access barring alleviation, to the 3GPP network in response to a determination that the configured policies permit the PDU session to be on the 3GPP network, and transferring UL and DL data from the PDU session over the 3GPP network. For example, the policies indicate whether a specific PDU session can be on 3GPP, or on non-3GPP. Accordingly, a policy can allow both handover and new PDU session establishment, as long as the PDU session is allowed.

Figure 13:
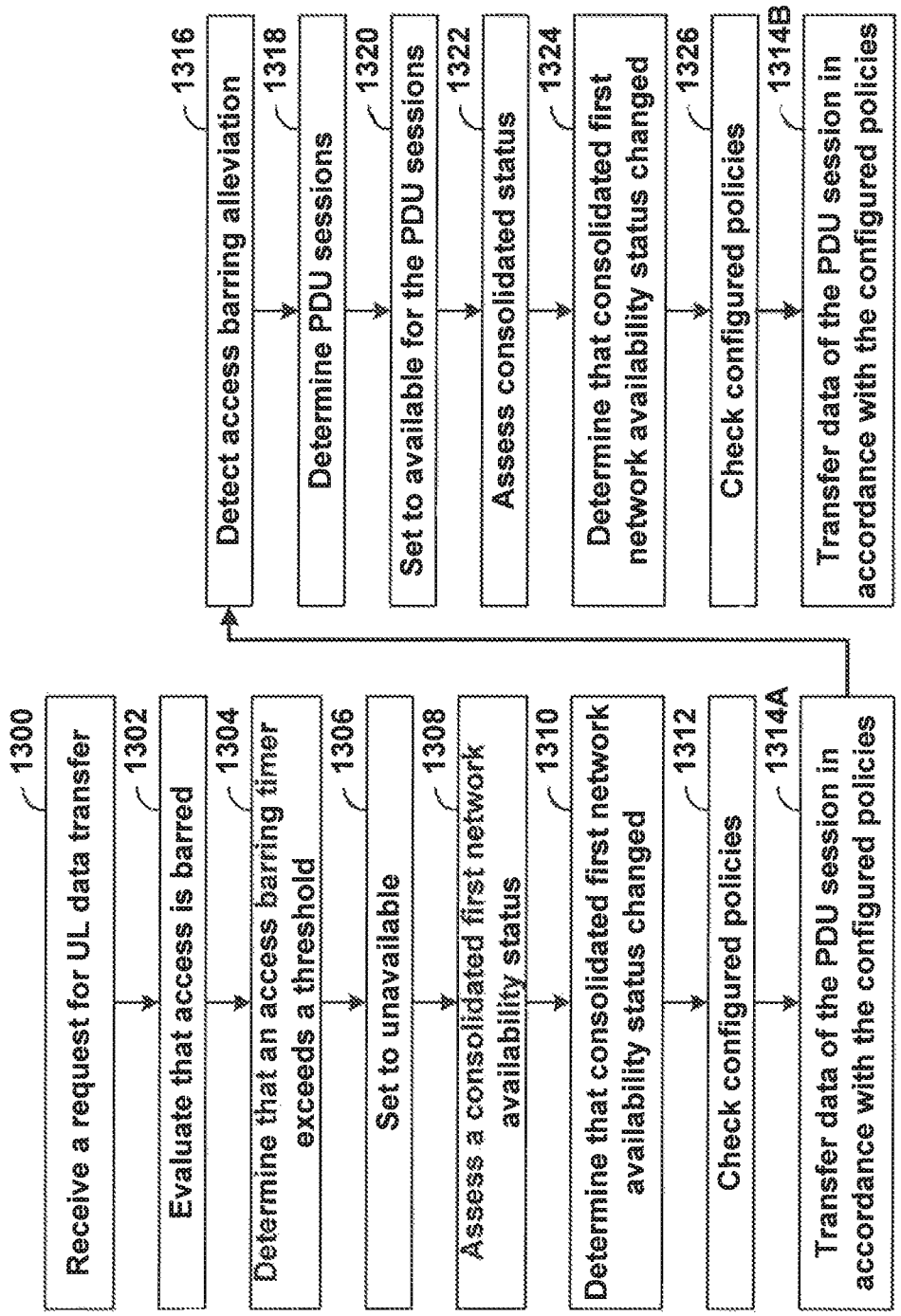
FIG. 13 is a block diagram conceptually illustrating example blocks of a method of performing wireless communications according to some embodiments of the present disclosure.

Turning now to FIG. 13, another method of wireless communication implements procedures as previously described, and is performed by a UE, such as UE 115 and/or UE 300. The method of FIG. 13 includes blocks 1300-1314A, which correspond to blocks 1100-1114 of FIG. 11. The method of FIG. 13 also includes blocks 1316-1326 and 1314B, which correspond to blocks 1216-1226 and 1314B of FIG. 12. In FIG. 13, processing proceeds from block 1314A to block 1316.

Figure 14:
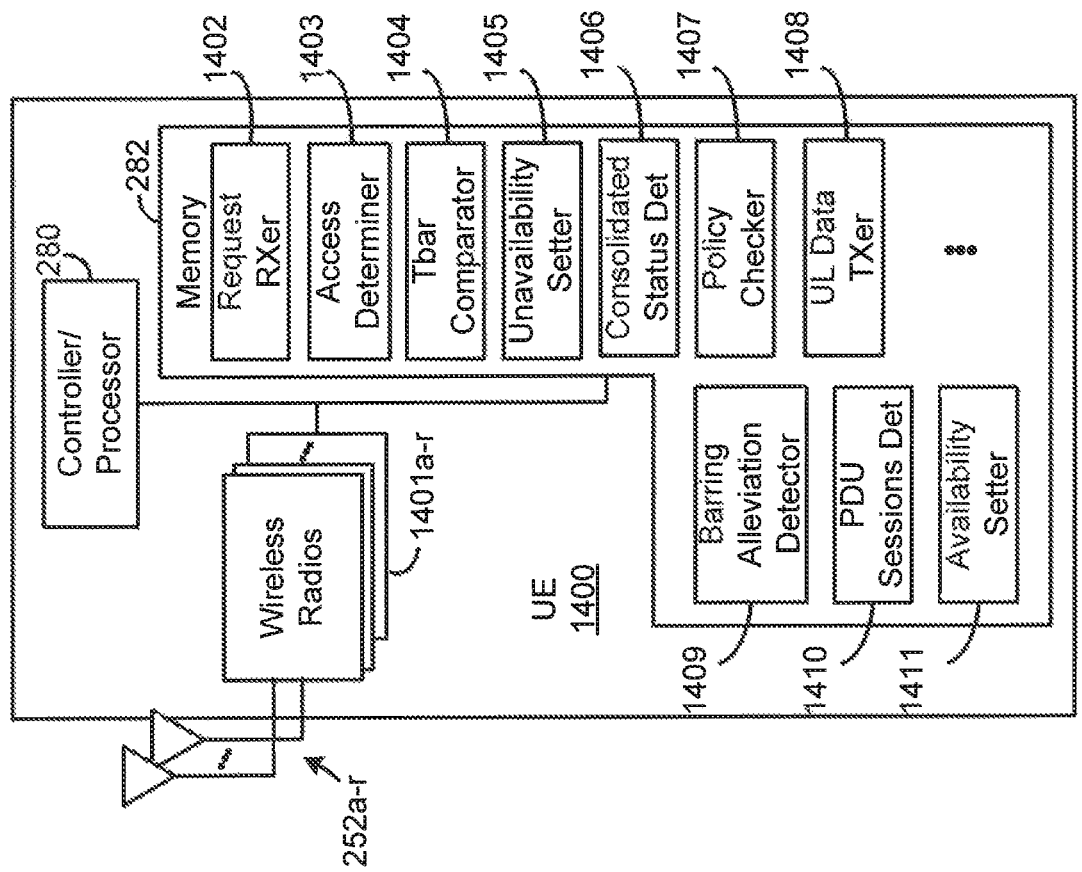
FIG. 14 is a block diagram conceptually illustrating a design of a UE configured to perform wireless communications according to some embodiments of the present disclosure.

Turning now to FIG. 14, a UE 1400, such as UE 115 and/or UE 300, may have a controller/processor 280, a memory 282, and antennas 252a through 252r, as described above. UE 1400 may also have wireless radios 1401a to 1401r that include additional components also described above with reference to FIG. 2. The memory 282 of UE 1400 stores one or more algorithms that configure processor/controller 280 to carry out one or more procedures as described above with reference to FIGS. 3-13.

One or more algorithms stored by memory 282 configure processor/controller 280 to carry out one or more procedures relating to wireless communication by the UE 1400, as previously described. For example, request receiver 1402 configures controller processor 280 to carry out operations that include receiving a request in any manner previously described, such as with reference to blocks 900, 1000, 1100, 1200, and 1300 (see FIGS. 9-13). Additionally, access determiner 1403 configures controller processor 280 to carry out operations that include evaluating whether access is barred in any manner previously described, such as with reference to blocks 324, 400, 510, 902, 928, 1002, 1102, 1202, 1214B, 1302, and 1314B (see FIGS. 3-5 and 9-13). Also, Tbar comparator 1404 configures controller processor 280 to carry out operations that include comparing barring time Tbar to a threshold in any manner previously described, such as with reference to blocks 402, 906, 1004, 1104, 1204, and 1304 (see FIGS. 4 and 9-13). Further, unavailability setter 1405 configures controller processor 280 to carry out operations that include setting unavailability in any manner previously described, such as with reference to blocks 404, 910, 1106, and 1306 (see FIGS. 4, 9, 11, and 13). Further, consolidated status determiner 1406 configures controller processor 280 to carry out operations that include assessing consolidated status in any manner previously described, such as with reference to blocks 406, 506, 600, 602, 800-806, 912, 1108, 1110, 1222, 1224, 1308, 1310, 1322, and 1324 (see FIGS. 4-9 and 11-13). Further, policy checker 1407 configures controller processor 280 to carry out operations that include checking configured policies in any manner previously described, such as with reference to blocks 408, 508, 914, 926, 1012, 1112, 1212, 1226, 1312, and 1326 (see FIGS. 4, 5, and 9-13). Further, UL data transmitter 1408 configures controller processor 280 to carry out operations that include transferring data in any manner previously described, such as with reference to blocks 410, 510, 904, 918, 1014, 1114, 1214A, 1214B, 1314A, and 1314B (see FIGS. 4, 5, and 9-13). Further, barring alleviation detector 1409 configures controller processor 280 to carry out operations that include detecting barring alleviation in any manner previously described, such as with reference to blocks 500, 920, 1216, and 1316 (see FIGS. 5, 9, 12, and 13). Further, PDU sessions determiner 1410 configures controller processor 280 to carry out operations that include determining PDU sessions associated with a barring alleviation in any manner previously described, such as with reference to blocks 502, 920, 1218, and 1318 (see FIGS. 5, 9, 12, and 13). Further, availability setter 1411 configures controller processor 280 to carry out operations that include setting availability in any manner previously described, such as with reference to blocks 504, 922, 1220, and 1320 (see FIGS. 5, 9, 12, and 13).

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules described herein (e.g., the functional blocks and modules in FIG. 2) may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps (e.g., the logical blocks in FIGS. 3-14 described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), hard disk, solid state disk, and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of performing wireless communication, the method comprising:
   receiving, by a user equipment (UE) from an application, a request for at least one of establishment of a packet data unit (PDU) session or uplink (UL) data transfer via a previously established PDU session;
   evaluating, by the UE in response to the request, that the requested establishment of the PDU session or UL data transfer via the previously established PDU session to a first network is barred by access control and an access barring time;
   determining, by the UE, that the access barring time exceeds a threshold;
   setting to unavailable, by the UE in response to the determining, an access control availability status for the PDU session;
   assessing a consolidated first network availability status based, at least in part, on the access control availability status for the PDU session and a non-access control availability status of the UE;
   detecting, by the UE, that the consolidated first network availability status for the PDU session was changed to unavailable as a result of the setting;
   checking, by the UE in response to the detecting, that configured policies permit the requested or previously established PDU session to be on a second network; and
   transferring, by the UE, data of the requested or previously established PDU session on the second network in accordance with the configured policies, while the non-access control availability status of the UE with respect to the first network is set to available, based, at least in part, on the detecting.

2. The method of claim 1, wherein the checking occurs in response to change in a consolidated first network availability status.

3. The method of claim 1,
   wherein the access control availability status is set based, at least in part, on whether the requested establishment of the PDU session or UL data transfer via the previously established PDU session to the first network is barred by access control and wherein the non-access control availability status is set based, at least in part, on a signal strength of the first network.

4. The method of claim 1, wherein the transferring data includes:
   one of initiating handover to or establishing the PDU session via the second network, by the UE, in response to a determination that the configured policies permit the PDU session to be on the second network; and
   transferring UL and downlink (DL) data for the PDU session via the second network.

5. The method of claim 1, further comprising:
   initiating handover, by the UE, for each PDU session associated with an access barring alleviation, to the first network in response to a determination that the configured policies permit handover of the PDU session to the first network; and
   transferring UL and DL data from the PDU session over the first network.

6. The method of claim 1, further comprising:
   detecting, by the UE, access barring alleviation due to at least one of expiration or stopping of the access barring timer; and
   checking, by the UE, for each PDU session associated with the access barring alleviation, whether configured policies permit PDU session handover to the first network.

7. The method of claim 1, further comprising:
   determining, by the UE in response to a detected access barring alleviation, which PDU sessions are associated with an access barring alleviation; and
   setting to available, by the UE in response to the detected access barring alleviation, access control availability status for the PDU sessions determined to be associated with the access barring alleviation.

8. The method of claim 1, further comprising:
   assessing, by the UE, an updated consolidated first network availability status of each PDU session associated with an access barring alleviation;
   detecting, by the UE, for each PDU session associated with the access barring alleviation, that the updated consolidated first network availability status for the PDU session was changed to available as a result of setting to available of an access control availability status; and
   checking, by the UE in response to the detecting that the updated consolidated first network availability status for the PDU session was changed to available, for each PDU session associated with an access barring alleviation, whether configured policies permit PDU session handover to the first network.

9. A wireless communication apparatus, the apparatus comprising:
one or more computer processors; and
one or more memories coupled to the one or more computer processors, wherein the one or more computer processors are configured to:
receive, by a user equipment (UE) from an application, a request for at least one of establishment of a packet data unit (PDU) session or uplink (UL) data transfer via a previously established PDU session;
evaluate, by the UE in response to the request, that the requested establishment of the PDU session or UL data transfer via the previously established PDU session to a first network is barred by access control and an access barring time;
determine, by the UE, that the access barring time exceeds a threshold;
set to unavailable, by the UE in response to the determination, an access control availability status for the PDU session;
assess a consolidated first network availability status based, at least in part, on the access control availability status for the PDU session and a non-access control availability status of the UE;
detect, by the UE, that the consolidated first network availability status for the PDU session was changed to unavailable as a result of the setting;
check, by the UE in response to the detection, that configured policies permit the requested or previously established PDU session to be on a second network; and
transfer data of the requested or previously established PDU session on the second network in accordance with the configured policies, while the non-access control availability status of the UE with respect to the first network is set to available.

10. The apparatus of claim 9, wherein the check occurs in response to change in a consolidated first network availability status.

11. The apparatus of claim 9,
wherein the access control availability status is set based, at least in part, on whether the requested establishment of the PDU session or UL data transfer via the previously established PDU session to the first network is barred by access control and wherein the non-access control availability status is set based, at least in part, on a signal strength of the first network.

12. The apparatus of claim 9, wherein the one or more computer processors are further configured to transfer data at least in part by:
one of initiating handover to or establishing the PDU session via the second network, by the UE, in response to a determination that the configured policies permit the PDU session to be on the second network; and
transferring UL and downlink (DL) data for the PDU session via the second network.

13. The apparatus of claim 9, wherein the one or more computer processors are further configured to:
initiate handover, by the UE, for each PDU session associated with an access barring alleviation, to the first network in response to a determination that the configured policies permit handover of the PDU session to the first network; and
transfer UL and DL data from the PDU session over the first network.

14. The apparatus of claim 9, wherein the one or more computer processors are further configured to:
detect, by the UE, access barring alleviation due to at least one of expiration or stopping of the access barring timer; and
check, by the UE, for each PDU session associated with the access barring alleviation, whether configured policies permit PDU session handover to the first network.

15. The apparatus of claim 9, wherein the one or more computer processors are further configured to:
determine, by the UE in response to a detected access barring alleviation, which PDU sessions are associated with an access barring alleviation; and
set to available, by the UE in response to the detected access barring alleviation, access control availability status for the PDU sessions determined to be associated with the access barring alleviation.

16. The apparatus of claim 9, wherein the one or more computer processors are further configured to:
assess, by the UE, an updated consolidated first network availability status of each PDU session associated with an access barring alleviation;
detect, by the UE, for each PDU session associated with the access barring alleviation, that the updated consolidated first network availability status for the PDU session was changed to available as a result of a setting to available of an access control availability status; and
check, by the UE in response to the detection that the updated consolidated first network availability status for the PDU session was changed to available, for each PDU session associated with an access barring alleviation, whether configured policies permit PDU session handover to the first network.

17. A non-transitory computer-readable medium having instructions recorded thereon that, when enacted by one or more computer processors, cause the one or more computer processors to:
receive, by a user equipment (UE) from an application, a request for at least one of establishment of a packet data unit (PDU) session or uplink (UL) data transfer via a previously established PDU session;
evaluate, by the UE in response to the request, that the requested establishment of the PDU session or UL data transfer via the previously established PDU session to a first network is barred by access control and an access barring time;
determine, by the UE, that the access barring time exceeds a threshold;
set to unavailable, by the UE in response to the determination, an access control availability status for the PDU session;
assess a consolidated first network availability status based, at least in part, on the access control availability status for the PDU session and a non-access control availability status of the UE;
detect, by the UE, that the consolidated first network availability status for the PDU session was changed to unavailable as a result of the setting;
check, by the UE in response to the detection, that configured policies permit the requested or previously established PDU session to be on a second network; and
transfer data of the requested or previously established PDU session on the second network in accordance with the configured policies, while the non-access control availability status of the UE with respect to the first network is set to available.

18. The computer-readable medium of claim 17, wherein the check occurs in response to change in a consolidated first network availability status.

19. The computer-readable medium of claim 17, wherein the access control availability status is set based, at least in part, on whether the requested establishment of the PDU session or UL data transfer via the previously established PDU session to the first network is barred by access control and wherein the non-access control availability status is set based, at least in part, on a signal strength of the first network.

20. The computer-readable medium of claim 17, wherein the instructions to transfer data cause the one or more computer processors to:
one of initiate handover to or establish the PDU session via the second network, by the UE, in response to a determination that the configured policies permit the PDU session to be on the second network; and
transfer UL and downlink (DL) data for the PDU session via the second network.

21. The computer-readable medium of claim 17, wherein the instructions further cause the one or more computer processors to:
initiate handover, by the UE, for each PDU session associated with an access barring alleviation, to the first network in response to a determination that the configured policies permit handover of the PDU session to the first network; and
transfer UL and DL data from the PDU session over the first network.

22. The computer-readable medium of claim 17, wherein the instructions further cause the one or more computer processors to:
detect, by the UE, access barring alleviation due to at least one of expiration or stopping of the access barring timer; and
check, by the UE, for each PDU session associated with the access barring alleviation, whether configured policies permit PDU session handover to the first network.

23. The computer-readable medium of claim 17, wherein the instructions further cause the one or more computer processors to:
determine, by the UE in response to a detected access barring alleviation, which PDU sessions are associated with an access barring alleviation; and
set to available, by the UE in response to the detected access barring alleviation, access control availability status for the PDU sessions determined to be associated with the access barring alleviation.

24. The computer-readable medium of claim 17, wherein the instructions further cause the one or more computer processors to:
assess, by the UE, an updated consolidated first network availability status of each PDU session associated with an access barring alleviation;
detect, by the UE, for each PDU session associated with the access barring alleviation, that the updated consolidated first network availability status for the PDU session was changed to available as a result of a setting to available of an access control availability status; and
check, by the UE in response to the detection that the updated consolidated first network availability status for the PDU session was changed to available, for each PDU session associated with an access barring alleviation, whether configured policies permit PDU session handover to the first network.

* * * * *